(12) United States Patent
Mayes

(10) Patent No.: US 6,398,165 B1
(45) Date of Patent: Jun. 4, 2002

(54) PROTECTIVE ENCLOSURE WITH PERIPHERAL FLUID STORAGE FACILITY

(75) Inventor: John S. Mayes, Alfred, NY (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/703,694

(22) Filed: Nov. 2, 2000

(51) Int. Cl.[7] ............................................. B64D 37/00
(52) U.S. Cl. ............................ 244/135 R; 244/135 A; 244/135 R; 244/135 C; 244/117; 244/119
(58) Field of Search ...................... 244/135 R, 135 A, 244/135 B, 135 C, 117, 158, 153, 29, 200, 117 A, 119, 126, 128; 114/312, 321

(56) References Cited

U.S. PATENT DOCUMENTS

| | | | | |
|---|---|---|---|---|
| 988,632 A | * | 4/1911 | D'Equevilley | 114/337 |
| 1,052,861 A | | 2/1913 | Swanson et al. | |
| 1,153,267 A | * | 9/1915 | Spear | 114/333 |
| 2,681,778 A | * | 6/1954 | Hughes | 244/135 R |
| 2,736,356 A | * | 2/1956 | Bender et al. | 220/723 |
| 3,443,776 A | * | 5/1969 | Moore | 244/119 |
| 3,450,374 A | * | 6/1969 | Moore | 101/91 |
| 3,559,920 A | * | 2/1971 | Moore | 244/5 |
| 3,559,923 A | * | 2/1971 | Moore | 244/119 |
| 3,687,401 A | * | 8/1972 | Moore | 244/119 |
| 3,718,295 A | * | 2/1973 | Moore | 244/119 |
| 3,735,947 A | * | 5/1973 | Moore | 244/100 R |
| 3,753,539 A | * | 8/1973 | Moore | 114/69 |
| 3,801,044 A | * | 4/1974 | Moore | 244/125 |
| 3,881,566 A | * | 5/1975 | Moore | 180/219 |
| 3,993,268 A | * | 11/1976 | Moore | 244/119 |
| 4,026,503 A | * | 5/1977 | Rhodes | 244/135 |
| 4,103,464 A | | 8/1978 | Clifft et al. | |
| 4,214,721 A | * | 7/1980 | Burhans, Jr. et al. | 244/135 |
| 4,224,891 A | * | 9/1980 | Rinaldi | 114/256 |
| 4,282,823 A | * | 8/1981 | Santi | 114/341 |
| 4,606,515 A | * | 8/1986 | Hicket | 244/29 |
| 4,817,890 A | * | 4/1989 | Coffinberry | 244/135 R |
| 4,948,070 A | * | 8/1990 | Lyman | 244/135 |
| 4,949,920 A | * | 8/1990 | Schindel et al. | 244/117 |
| 4,986,495 A | * | 1/1991 | Stromath et al. | 244/117 |
| 5,129,429 A | | 7/1992 | Winter et al. | |
| 5,279,332 A | | 1/1994 | Winter et al. | |
| 5,423,498 A | * | 6/1995 | Fluegel | 244/117 |
| 5,806,457 A | * | 9/1998 | Gauthier et al. | 114/312 |
| 5,845,879 A | * | 12/1998 | Jensen | 244/135 |
| 5,927,651 A | * | 7/1999 | Geders et al. | 244/135 |
| 6,123,295 A | * | 9/2000 | Wexler et al. | 244/160 |

* cited by examiner

*Primary Examiner*—Charles T. Jordan
*Assistant Examiner*—Stephen A Holzen
(74) *Attorney, Agent, or Firm*—Jacob Shuster

(57) ABSTRACT

Fluids such as air, liquid or gaseous fuels are stored within a passage of a helically wound flexible hose sandwiched within a peripheral portion of a tubular enclosure of a transport vehicle between an outer shell and an inner support layer of such tubular enclosure, within which equipment and personnel are transported through an environment such as seawater, atmospheric aerospace or outer space. The foregoing structural arrangement provides for highly efficient performance of fluid storing tankage and vehicle envelope support functions.

9 Claims, 2 Drawing Sheets

PROTECTIVE ENCLOSURE WITH PERIPHERAL FLUID STORAGE FACILITY

The present invention relates generally to storage of fluids within vehicular enclosures.

BACKGROUND OF THE INVENTION

Self-propelled transport vehicles such as submarines, rockets and aircraft usually store therein fluids such as liquid or gaseous fuels, as well as air, water and equipment for use by personnel during travel within such vehicles. Conventionally, the liquid or gaseous fuels are stored for consumption during travel by tanks which occupy and thereby limit the internal volume of the vehicle as well as to add to its total weight. External storage of such fuels on the vehicle are often prohibited by hydrodynamic or aerodynamic considerations associated with seawater or aerospace environments. Attempts to deal with the foregoing fluid storage problems heretofore involved fabrication methods and constructional materials that are costly. It is therefore an important object of the present invention to provide less costly and more efficient storage of fluids such as fuels, water or air within vehicles used for transportation of personnel and equipment, such as marine vessel hulls, rockets and aircraft fuselages.

SUMMARY OF THE INVENTION

In accordance with the present invention, the tubular enclosure of a transport vehicle such as a marine vessel hull, an aerospace rocket or an aircraft fuselage stores fluids such as liquid or gaseous fuels to be consumed within an outer peripheral portion of the tubular enclosure established between an outer protective shell of the transport vehicle structure and an inner support layer. Sandwiched between the outer shell and inner support layer forming the outer peripheral portion of the tubular enclosure are flexible hoses within which a continuous storage passage is formed for reception and storage of the fluids therein. The flexible hoses are helically wound to facilitate disposition within the outer peripheral portion of the tubular enclosure protected from the external travel environment by the outer shell, with insulation filling interstices about the hoses for thermal protection of the fluids stored therein. The foregoing structural arrangement combines the functions of fluid storing tankage and vehicle envelope support in a most efficient manner.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
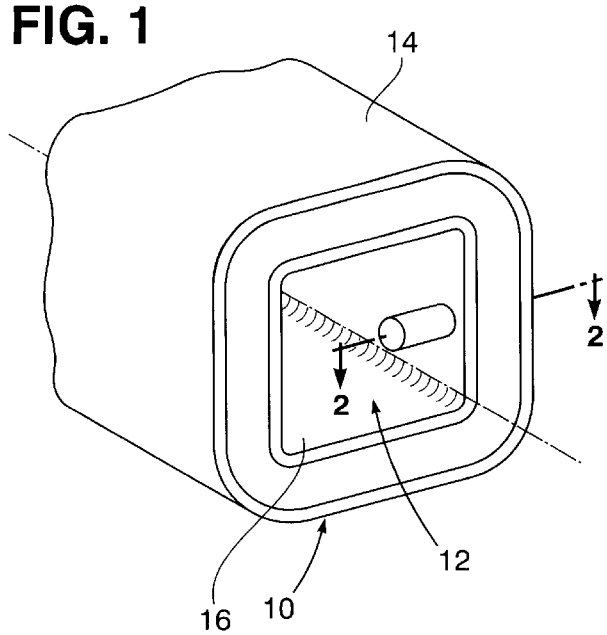
FIG. 1 is a perspective view of an end portion of a vehicular structure with which the present invention is associated.

Referring now to the drawing in detail, FIG. 1 illustrates an end portion of a tubular enclosure of a transport vehicle such as a hull structure 10 of a marine vessel within which an internal chamber 12 is enclosed. Such tubular hull structure 10 is fabricated as a sandwich core type of construction which includes an outer skin shell 14 and an inner support layer 16. The outer shell 14 is made of a fiber-reinforced material such as glass/epoxy that is resistant to the environmental effects of water or air, while the inner support layer 16 is made of a comparable fiber-reinforced material forming the wall surface of the tubular-shaped chamber 12.

Figure 2:
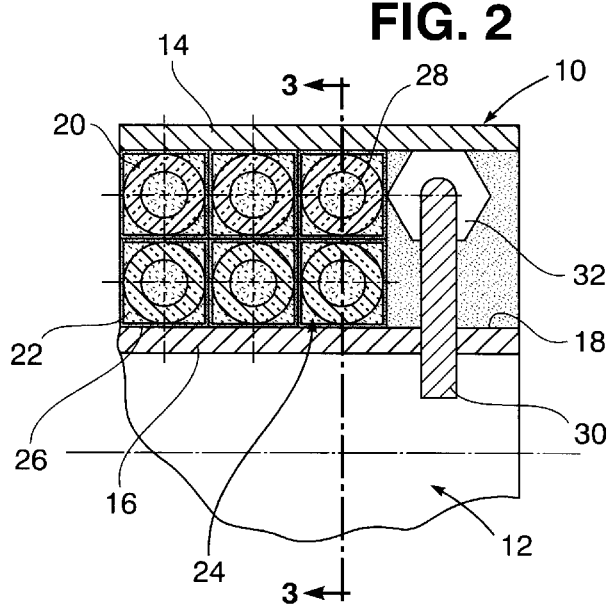
FIG. 2 is a partial section view taken substantially through a plane indicated by section line 2—2 in FIG. 1.
Figure 3:
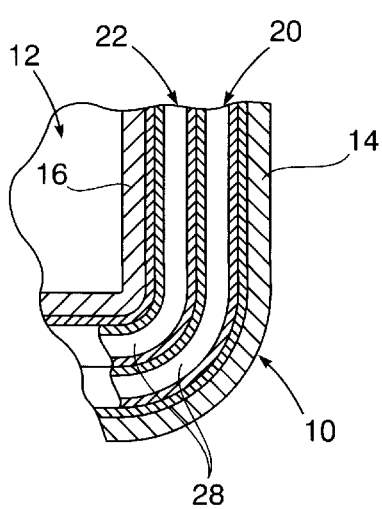
FIG. 3 is a partial section view taken substantially through a plane indicated by section line 3—3 in FIG. 2.
Figure 4:
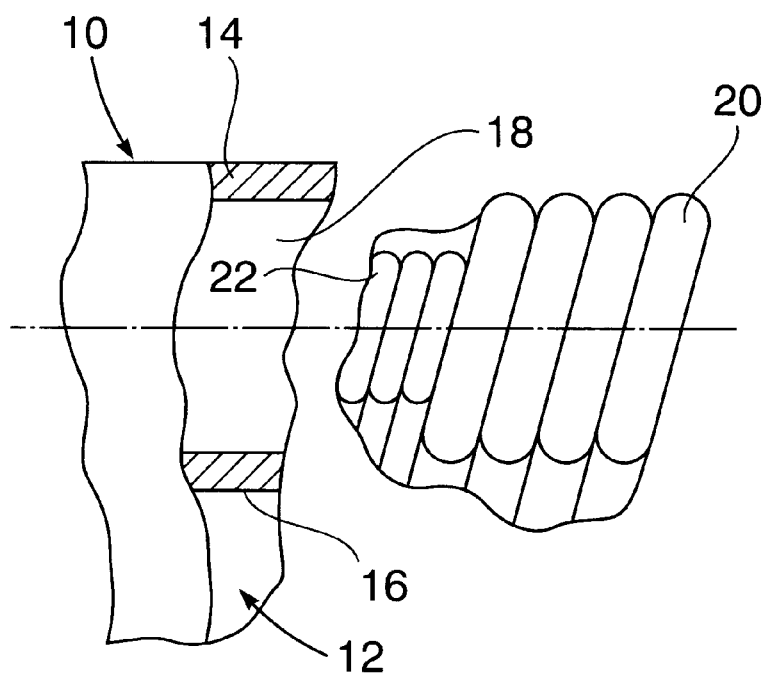
FIG. 4 is a partial side elevation and section view of aligned disassembled portions of the structure shown in FIGS. 1, 2 and 3.
Figure 5:
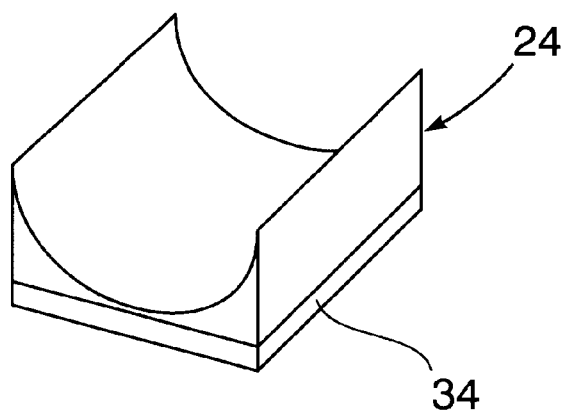
FIG. 5 is a perspective view of one of the foam sections filling interstices between fluid storing hoses shown in FIG. 2.

As shown in FIGS. 2, 3 and 4, the inner layer 16 is uniformly spaced from the outer shell 14 to form a peripheral storage space 18 within which a sandwich core is disposed including a radially outer helically wound hose 20 in contact with the outer shell 14 and a radially inner helically wound hose 22 in contact with the inner layer 16. Such hoses 20 and 22 are made of a non-metallic material such as a fiber-reinforced polymer that is flexible so as to accommodate helical bending thereof for disposition within the peripheral storage space 18 and to retain therein a liquid or gaseous fluid such as fuel under pressure. The interstices between the hoses 20 and 22 within the storage space 18 are filled by sections 24 made of low density foam material, having thin fiberglass sheets 34 bonded thereto as shown in FIG. 5. Such foam sections 24 have machined contours to accommodate the hoses 20 and 22 and complete the structural integrity of the core. Also, surface area is provided for subsequent bonding to hoses, foam layers and shells. Each foam section 24 is for example made of an acrylic material, while a neat urethane resin filler 26 may be inserted adjacent to each of the points of contact between the hoses 20 and 22 and adjacent to their points of contact with the outer shell 14 and the inner support layer 16.

As also shown in FIG. 2, at one end of the hoses 20 and 22, which are not interconnected with each other, fluid under pressure may be injected by withdrawal of an access plug 30, penetrating the hull structure 10, to expose an opening 32 through which inflow of the fluid into a fluid storing passage 28A of hose 20 occurs. After injection of the fluid, the plug 30 is reinserted to seal and store the fluid within the hose passage 28A. A similar arrangement may be provided for access to the fluid storing passage 28B in the hose 22.

It should be apparent from the foregoing description that a variety of different materials with suitable properties may be utilized for the outer shell 14 and the inner support layer 16, establishing a net cross-sectional shape of the tubular structure 10 which may vary as long as it remains tubular to facilitate disposition of the hoses 20 and 22 in a helical condition within the peripheral storage space 18. A single layer or multiple layers of such hoses made of commercially available flexible material, may be embedded in the peripheral storage space 18 to meet the payload.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a structure having an outer shell enclosing a tubular chamber in protective relation to an external environment; means for storing fluid within said chamber during travel of the structure through said external environment, comprising: inner support means peripherally positioned within the tubular chamber in spaced relation to the outer shell for establishing a peripheral storage space; flexible means peripherally sandwiched in helical wound condition within said storage space between the inner support means and the outer shell for retention of the fluid therein; including: radially inner and outer hoses in contact with the inner support means and the outer shell at spaced contact points; insulation means filling all interstices about and between the hoses within the peripheral storage space for thermal protection of the fluid therein; and access means connected to the structure for injection of the fluid into the hoses to be stored therein within the peripheral storage space.

2. The combination as defined in claim 1, wherein each of said hoses is made of a non-metallic, fiber-reinforced polymer material retaining the fluid therein under pressure.

3. The combination as defined in claim 2, wherein said inner support means is a layer of fiber-reinforced material; the outer shell is made of environment resistant material; and wherein the insulation means comprises foam sections between the hoses and resin filler in contact therewith adjacent to the spaced contact points on the outer shell.

4. The combination as defined in claim 3, wherein the external environment is seawater within underwater location.

5. The combination as defined in claim 1, wherein the external environment is seawater within underwater location.

6. The combination as defined in claim 1, wherein the external environment is atmospheric aerospace.

7. The combination as defined in claim 1, wherein said inner support means is a layer of fiber-reinforced material; the outer shell is made of environment resistant material; and the insulation means is foam.

8. In combination with a tubular enclosure having an outer shell; helically wound tubing means for storing fluid under pressure therein; an inner support surface peripherally establishing a storage space within the enclosure with the tubing means disposed therein; and insulation means completely filling all interstices within said storage space about the tubing means; the improvement residing in: said tubing means including radially outer and inner hoses made of nonmetallic flexible material respectively engaged with the outer shell and the inner support surface at spaced contact points; and said insulation means being formed by foam sections between the hoses and by resin fillers located adjacent to said contact points.

9. The improvement as defined in claim 8, wherein each of said foam sections comprises: a foam body having an arcuate surface contoured for contact with the hoses; and a fiberglass sheet on the foam body through which contact between the foam sections is established.

* * * * *